Jan. 21, 1964  J. H. WERNIG  3,118,644
WIRING FASTENERS
Filed Sept. 15, 1960  3 Sheets-Sheet 1
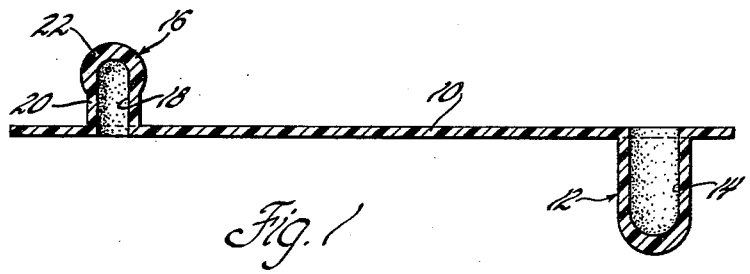
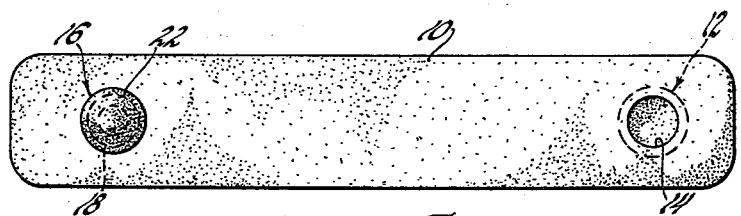
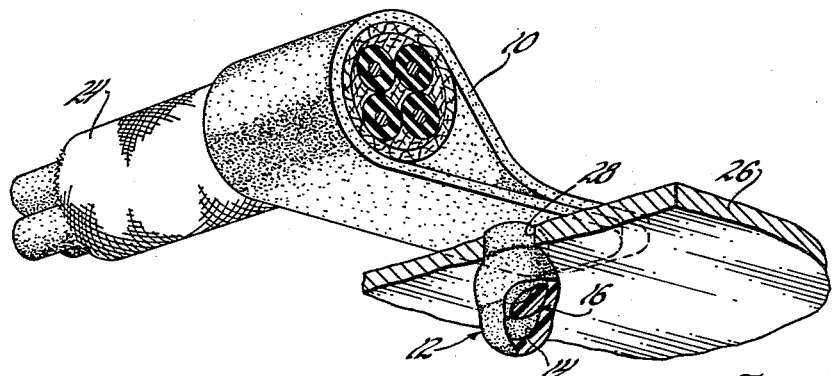
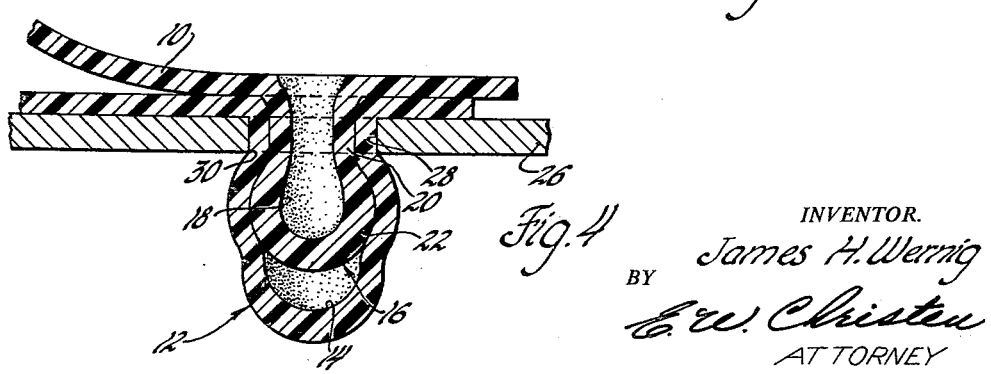
INVENTOR.
James H. Wernig
BY
E. W. Christen
ATTORNEY Jan. 21, 1964  J. H. WERNIG  3,118,644
WIRING FASTENERS Filed Sept. 15, 1960  3 Sheets-Sheet 2

INVENTOR.
James H. Wernig
BY
E. W. Christen
ATTORNEY

Jan. 21, 1964   J. H. WERNIG   3,118,644
WIRING FASTENERS
Filed Sept. 15, 1960   3 Sheets-Sheet 3

INVENTOR.
James H. Wernig
BY
E. W. Christen
ATTORNEY 3,118,644
WIRING FASTENERS
James H. Wernig, Birmingham, Mich., assignor to General Motors Corporation, Detroit, Mich., a corporation of Delaware
Filed Sept. 15, 1960, Ser. No. 56,237
3 Claims. (Cl. 248—73)

This application relates to wiring fasteners, and more particularly to plastic wiring strips adapted to be looped around a wire or cable and secure said wire or cable to a supporting panel.

In many wiring installations and particularly in automobiles and the like, it is often necessary to secure a wire or cable to a supporting panel. In automobiles, for example, the ignition wiring and other electrical wiring is generally secured along the side walls of the engine compartment and must be properly retained to prevent the wire from interference with the operation of the engine.

Many devices have been utilized in the past to secure such wiring to supporting panels, the most common being the use of metal clips or fasteners at spaced points along the length of the individual wires and secured in some manner to the supporting panel. Also, metal strips of some type have been utilized in a similar manner. Numerous problems are involved when using metallic clips, the most common being the corrosion that tends to develop where the metal clip comes in contact with the supporting panel. Further, none of the devices used in the past have provided sealing of the hole in the supporting panel. This lack of sealing permits the entry of dust, dirt and water to the engine compartment which is injurious to the engine and to the parts in the engine compartment, and begins the corrosion of the supporting panel at the point of entry.

The device in which this invention is embodied comprises a plastic wiring fastener which is adapted to be looped around a wire or cable and secured in the supporting panel in such a manner as to seal the hole in the supporting panel from the entry of dirt, dust and other foreign materials. The fastener is made of a suitable plastic material which eliminates the corrosion problem and adequately seals the panel hole by expanding against the edges thereof. The device provides a more economical and efficient fastening means and is simple to manufacture and assemble.

These and other advantages will become more apparent from the following description and drawings, in which:

FIGURE 1 is a cross-sectional view of the wiring fastener embodying this invention;

FIGURE 2 is a plan view of the wiring fastener illustrated in FIGURE 1;

FIGURE 3 is an isometric view of the wiring fastener installation including the fastener shown in FIGURES 1 and 2, and illustrating the position of the various parts upon assembly;

FIGURE 4 is a cross-sectional view of the installation illustrated in FIGURE 3;

Figure 5:
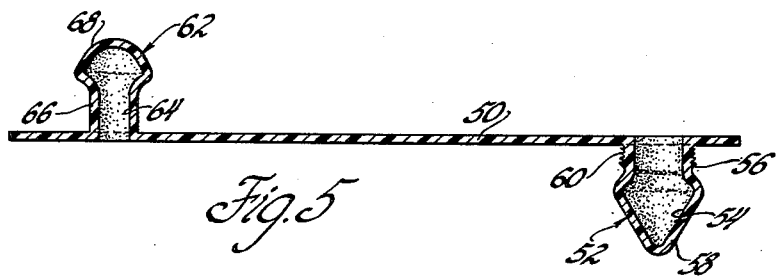
FIGURES 5 and 6 illustrate a modification of the wiring fastener shown in FIGURES 1–4.

Referring more particularly to the drawings, FIGURES 1–4 illustrate a plastic wiring fastener and the method of installation and retention of the fastener in a supporting panel. Referring first to FIGURES 1 and 2, the fastener is shown to include a strip portion 10 which is of suitable length to permit being formed into a loop to retain the wire or cable as will be hereinafter described. Extending from one end of the strip 10 is a tubular member or socket 12 having an opening 14 formed therein. The tubular member is formed out of the strip 10 such that the strip and tubular member are integral. Extending from the opposite end of the strip 10 is a plug member, illustrated generally by the numeral 16, which has a blind bore 18 formed therein. The plug member 16 includes a shank portion 20 and a ball portion 22 and is of sufficient resilience to permit the ball portion to collapse slightly on passage through the panel hole, as will be hereinafter described. Plug member 16 is integrally formed from the strip 10 in the same manner as tubular portion 12 is formed from strip 10. It is to be noted that plug member 16 is shown extending from strip 10 in a direction opposite to the direction that the tubular portion 12 extends therefrom, although it is conceivable that plug member 16 extend from the strip 10 in the same direction as the tubular member 12.

A typical installation is illustrated in FIGURES 3 and 4, in which a wire or cable 24 is to be secured to a supporting panel 26 having an aperture 28 formed therein. Strip member 10 is shown formed in a loop and about the wire or cable 24, and tubular portion 12 extends through the panel hole 28. The diameter of tubular portion 12 is substantially the same as the diameter of aperture 28, to provide a close fitting engagement. Plug member 16 is shown inserted in the tubular member 12 and through the aperture 28 in panel 26, the ball portion 22 expanding the walls of the tubular portion 12 to a diameter greater than the diameter of the apterture 28. This is because the maximum diameter of the ball portion 22 is greater than the internal diameter of the tubular member 12. With this configuration, the plug member 16 expands tubular member 12 on the opposite side of the panel 26 from the strip 10 to force the external wall of the tubular member 12 into engagement with the lower corner 30 of the aperture 28 in the panel 26. This securely retains the fastener in the supporting panel 26 and at the same time seals the aperture 28 against the entry of dirt, dust or moisture. Since plug member 16 is hollow, or provided with a bore 18, the plug member will collapse slightly when forced into the tubular member 14 and due to its natural resilience and the resilience of the tubular member 12, will expand upon advancement past the supporting panel 26. Thus, a secure installation for wire or cable 24 is provided.

Figure 6:
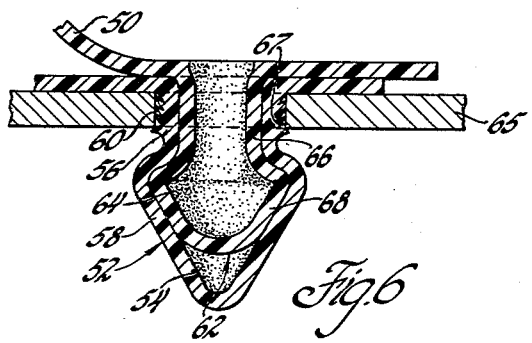

FIGURES 5 and 6 illustrate a modification of the wiring fastener above described. Referring to these figures, a strip 50 has a tubular member 52 extending from adjacent one end thereof, tubular member 52 having a central opening indicated by numeral 54. Tubular member 52 is shown to include a shank portion 56 and a conical portion 58, shank portion 56 being provided with a plurality of annular barbs 60, the purpose for which will be later described. Extending from the opposite end of the strip 50 is a plug member, illustrated generally by the numeral 62, which is shown to include a central opening 64 to permit the plug member to collapse as will be hereinafter described. Plug member 62 includes a shank portion 66 and an enlarged portion 68 and is receivable in the tubular member 52 to form a loop in strip 50 for retaining the wire or cable.

FIGURE 6 illustrates the assembly of the fastener shown in FIGURE 5 wherein a supporting panel 65 has an aperture 67 formed therein to receive the tubular member 52 and plug member 62. Tubular member 52 has a maximum diameter greater than the diameter of aperture 67 and the shank 56 of tubular member 52 is substantially the same diameter as the diameter of aperture 67. The maximum diameter of plug member 62 is greater than the internal diameter of the shank 56 such that when plug member 62 is inserted in the tubular member 52 the annular barbs 60 will be forced into sealing engagement with the side walls of the aperture 67 in the panel 65. At the same time tubular member 52 is expanded to a sufficient degree to prevent removal of the fastener from the supporting panel 65 without collapse of both the plug member 62 and the tubular member 52. This prevents the fastener from becoming loose or falling out of the panel 65 due to vibrations or the like.

Figure 7:
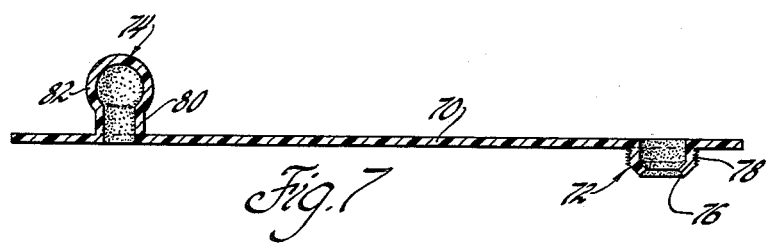
FIGURES 7 and 8 illustrate a second modification of the wiring fastener shown in FIGURES 1–4.
Figure 8:
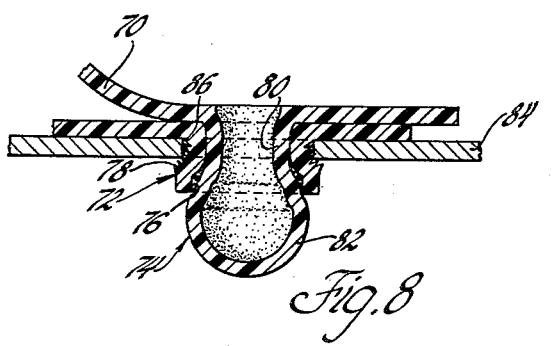

FIGURES 7 and 8 illustrate a second modification of the fastener shown in FIGURES 1–4. This modification is shown to include a strip 70 having an open ended tubular member 72 extending from one end thereof and a plug member 74 extending from the other end thereof. Tubular member 72 has a restricted opening 76 at the outer end and a plurality of annular barbs 78 formed along the shank thereof. Plug member 74 includes a shank portion 80 and a spherical portion 82, the outer maximum diameter of which is greater than the internal diameter of the tubular member 72. The diameter of shank portion 80 of the plug member 74 is substantially the same as the internal diameter of plug member 72 and is greater than the diameter of the restricted opening 76.

The installation of the fastener illustrated in FIGURE 7 is shown in FIGURE 8. A supporting panel 84 has an aperture 86 formed therein to receive the fastener. Tubular member 72 is first inserted in the aperture 86, the outer diameter of the tubular member 72 being substantially the same as the diameter of aperture 86. Plug member 74 is then inserted in the tubular member 72, and the spherical portion 82, being of such diameter, causes the lower end of the tubular member 72 to expand to a diameter greater than the diameter of the aperture 86. The shank portion 80 of plug member 74 causes the tubular member 72 to expand slightly and provide a secure sealing engagement by expanding the annular barbs 78 more tightly against the walls of the aperture 86. Thus, the tubular member 72 is expanded to such a degree by plug member 74 that the end thereof overlies the aperture 86 in the panel 84 to both prevent removal and to seal the aperture 86.

Figure 9:
FIGURES 9 and 10 illustrate a third modification of the wiring fastener shown in FIGURES 1–4.
Figure 10:
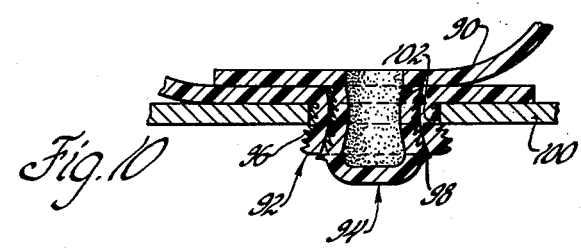

FIGURES 9 and 10 illustrate a third modification of the fastener shown in FIGURES 1–4. FIGURE 9 shows a strip 90 having a tubular member 92 extending from one end thereof and a plug member 94 extending from the opposite end thereof. This figure illustrates the use of a fastener having both tubular member and plug member extending from the strip in the same direction. Tubular member 92 is cylindrical in shape having an opening 95 at the outer end and a plurality of annular barbs 96 along the sides thereof. Plug member 94 has a closed end and is also provided with a plurality of annular barbs 98 along the sides thereof.

FIGURE 10 illustrates the installation of the fastener shown in FIGURE 9. A supporting panel 100 has an aperture 102 formed therein to receive the tubular member 92 and plug member 94. The external diameter of the tubular member 92 is substantially the same as the diameter of the aperture 102 in the panel 100 and the exterior diameter of plug member 94 is substantially the same as the internal diameter of tubular member 92. Thus, when plug member 94 is forced into tubular member 92 and in the panel 100, the annular barbs 96 on the tubular member 92 and the annular barbs 98 on plug member 94 are compressed to cause a secure sealing engagement between the tubular member 92 and the walls of the aperture 102 and between the plug member 94 and the internal wall of tubular member 92. At the same time tubular member 92 is expanded slightly at the opposite side of the panel from the strip 90 to positively seal aperture 102 and to securely retain the fastener in the supporting panel 100.

Figure 11:
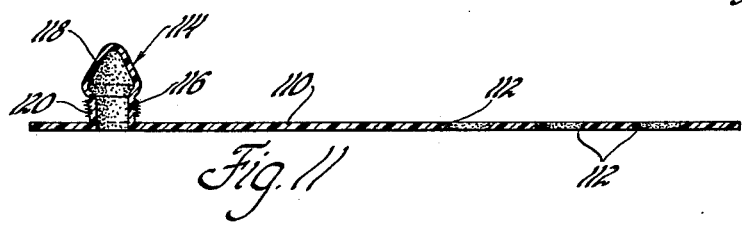
FIGURES 11 and 12 illustrate a fourth modification of the wiring fastener shown in FIGURES 1–4.
Figure 12:
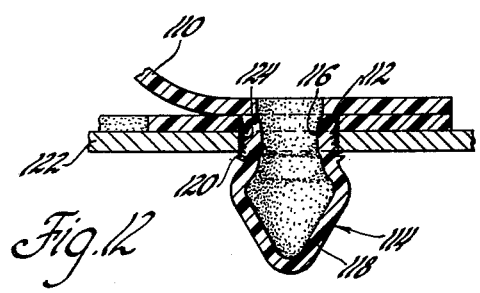

Another modification of the fastener shown in FIGURES 1–4 is illustrated in FIGURES 11 and 12. FIGURE 11 shows a strip 110 having a plurality of spaced apertures 112 formed therein and beginning adjacent one end thereof. A plug member 114 extends from the strip 110 and is shown to include a shank portion 116 and a conical portion 118. Shank portion 116 is provided with a plurality of external annular barbs 120, the purpose for which will be hereinafter described.

FIGURE 12 illustrates the assembly of the fastener shown in FIGURE 11 in which a supporting panel 122 is provided with an aperture 124. The strip 110 is adapted to overlie the panel 122 with one of the apertures 112 in registry with aperture 124 in the panel. Plug member 114 is then inserted through the two apertures 112 and 124. The maximum diameter of conical portion 118 is greater than the diameter of either apertures 112 or aperture 124. The diameter of shank portion 116 is substantially the same as the aperture diameters, such that when the plug member 114 is inserted the annular barbs 120 are expanded against the walls of both aperture 112 and aperture 124 to positively seal the opening. The enlarged diameter of conical portion 118 prevents removal of the fastener from the panel 122.

Figure 13:
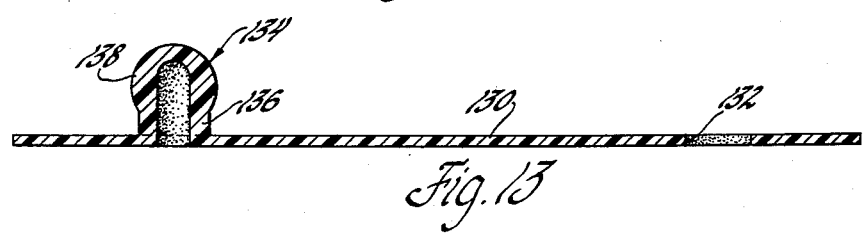
FIGURES 13 and 14 illustrate another modification of the wiring fastener illustrated in FIGURES 1–4.
Figure 14:
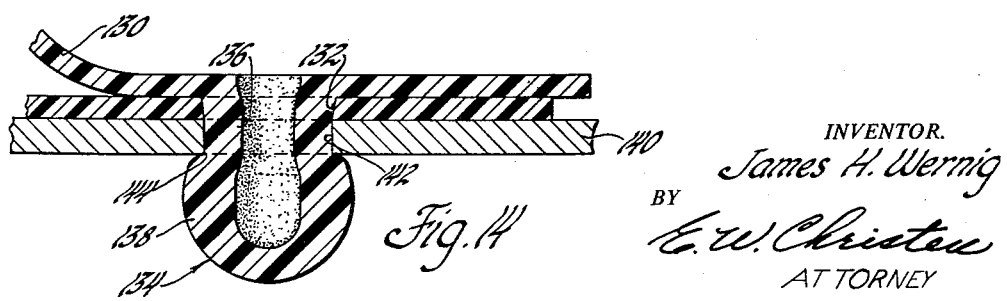

A fifth modification of the fastener illustrated in FIGURES 1–4 is shown in FIGURES 13 and 14. FIGURE 13 shows a strip 130 having an aperture 132 formed adjacent one end thereof. Strip 130 may have a series of spaced apertures, as illustrated in the modification shown in FIGURE 11. A plug member 134 extends from strip 130 and includes a shank portion 136 and a ball portion 138.

In the installation, as shown in FIGURE 14, a supporting panel 140 is provided with a suitable aperture 142 which is substantially the same diameter as the aperture 132 in the strip 130. Ball portion 138 of plug member 134 has a maximum diameter greater than the diameter of aperture 132 or the diameter of aperture 142. The diameter of shank portion 136 is substantially the same as the diameters of the two apertures 132 and 142.

The ball portion 138 first contracts and then expands as it is forced through aperture 132 and aperture 142 on assembly and its natural resilience permits expansion on the opposite side of the panel 140 from the strip 130 such that the ball portion 138 overlies the corner 144 of the aperture 142. This securely retains the fastener in the supporting panel 140 and seals the aperture 142 from the entry of foreign materials or moisture.

In any of the above described modifications the fastener may be assembled in the supporting panel by means of a suitable tool adapted to be received in the hollow plug members to elongate and contract said members on passage through the supporting panel. Otherwise, if the fasteners are of suitable material, it is possible that the plug members may be inserted without the use of special tools.

Thus, a wiring fastener is provided which is easily insertable in a supporting panel and which securely retains a wire or cable overlying the supporting panel. Being of plastic, the fastener prevents the formation of rust and corrosion about the aperture in the supporting panel and also seals the aperture in the panel to prevent the entry of dirt or moisture, thus protecting the engine compartment and the parts mounted therein from the adverse effects of such dirt or moisture.

What is claimed is:

1. A plastic wiring fastener for securing a wire to a supporting panel having an aperture therein and comprising a substantially planar strip having an aperture formed therethrough and adjacent one end thereof, uninterrupted wall means extending from said strip and surrounding said aperture, said strip being adapted to overlie one side of said panel with said wall means extending into said aperture in said panel and said aperture in said strip in registry with said aperture in said panel, and a hollow plug formed out of said strip adjacent the other end thereof and receivable in said aperture in said strip and said aperture in said panel, said plug having a maximum diameter greater than the internal diameter of either of said apertures and adapted to enlarge said uninterrupted wall means into complete sealing and retaining engagement with the edge of said aperture in the other side of said supporting panel.

2. A plastic wiring fastener for securing a wire to a supporting panel having an aperture therein and comprising a strip having an aperture formed therein and adjacent one end thereof, uninterrupted wall means extending from said strip and surrounding said aperture, said strip being adapted to overlie said panel with said wall means extending into said aperture in said panel and aperture in said strip in registry with said aperture in said panel, and a hollow plug extending from said strip and adjacent the other end thereof, said plug being receivable in said aperture in said strip and in said wall means and in said aperture in said panel to form a wire receiving and retaining loop in said strip, said plug being of a maximum diameter greater than the internal diameter of said aperture in said supporting panel and first collapsible and then expandable on passage through said apertures to enlarge said uninterrupted wall means and completely seal said aperture in said supporting panel.

3. A wiring installation comprising a supporting panel having an aperture therethrough, a wire overlying said panel and adjacent said aperture, and a plastic wiring fastener securing said wire to said panel, said fastener including a loop portion surrounding said wire and having an aperture therein and adjacent one end thereof, uninterrupted wall means extending from said strip and surrounding said aperture and received in said aperture in said supporting panel, and a hollow plug extending from said loop portion and received in said aperture and in said wall means in said loop portion and in said aperture in said panel to secure said fastener in said panel, said plug having a maximum diameter greater than the internal diameter of said aperture in said supporting panel and said aperture in said loop portion for enlarging said uninterrupted wall means and completely sealing said aperture in said supporting panel and retaining said wire on said panel.

References Cited in the file of this patent

UNITED STATES PATENTS

| | | |
|---|---|---|
| 2,445,481 | GeWertz | July 20, 1948 |
| 2,548,104 | Frison | Apr. 10, 1951 |
| 2,759,390 | Edwards | Aug. 21, 1956 |
| 2,896,889 | Herschberger et al. | July 28, 1959 |
| 2,937,834 | Orenick | May 24, 1960 |
| 2,941,768 | Elms | June 21, 1960 |
| 2,974,916 | Richey | Mar. 14, 1961 |
| 2,986,396 | Abbott | May 30, 1961 |
| 3,018,529 | Perrochat | Jan. 30, 1962 |